Feb. 12, 1935.   M. LOUGHEAD ET AL   1,990,493
BRAKING MECHANISM
Filed Nov. 10, 1928   2 Sheets-Sheet 1
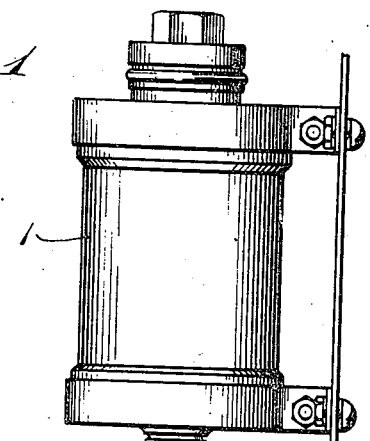
Fig.1
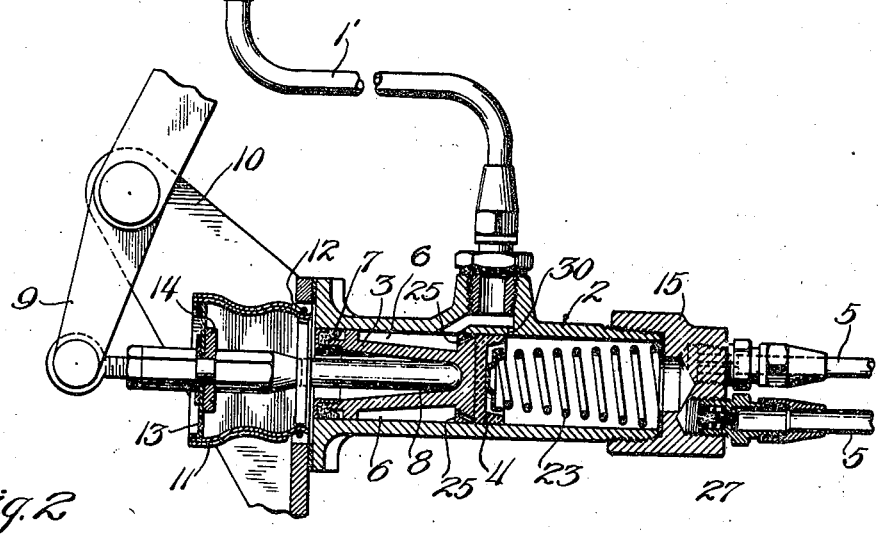
Fig.2
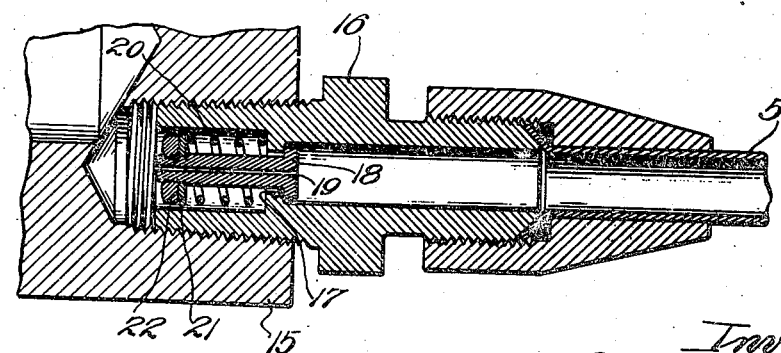
Inventors:
Malcolm Loughead
Wallace F. Oliver
By Williams, Bradbury, McCaleb & Hinds
Attys.

Inventors:
Malcolm Loughead
Wallace F. Oliver
By Williams, Bradbury, McCaleb & Hinkle
Attys.

Patented Feb. 12, 1935

1,990,493

UNITED STATES PATENT OFFICE 1,990,493

BRAKING MECHANISM

Malcolm Loughead, Los Angeles, Calif., and Wallace F. Oliver, Detroit, Mich., assignors to Hydraulic Brake Company, Los Angeles, Calif., a corporation of California Application November 10, 1928, Serial No. 318,456

3 Claims. (Cl. 60—54.5)

This invention relates to hydraulic brake systems and particularly to improvements in the mechanical structure involved in freeing air from the system, thus permitting the system to be completely charged with brake fluid during normal operation.

An object of the invention is to simplify the mechanism of the master cylinder normally used in connection with hydraulic brake systems.

A further object is to provide a master cylinder without the usual valve mechanism for regulating the speed of flow of the brake fluid from and to the said master cylinder.

A further object of the invention is to provide a hydraulic brake wherein the return speed of the brake fluid to the master cylinder is controlled through the medium of restrictions in the lines between the wheel cylinders and the master cylinder.

Another object is to provide in a hydraulic brake system novel means for preventing the reentry of air into the wheel cylinders during the initial entry of fluid to the fluid system.

In the co-pending application of Malcolm Loughead, Serial No. 304,195, filed September 6, 1928, one of the co-inventors of the hereindescribed device, there is shown a hydraulic brake mechanism including a master cylinder having a valve mounted therein to control the speed of the return of the brake fluid from the pressure lines to the master cylinder and to maintain a pressure of approximately six pounds within the said lines when the valve is in a closed position. Our invention contemplates the elimination of this complicated valve mechanism by the substitution of other means for accomplishing the same result disposed exteriorly of the master cylinder.

Other objects and advantages of the invention appear as the description proceeds.

In the drawings:

Fig. 1 is a side elevation partially in section of a master cylinder and brake fluid reservoir;

Fig. 2 is a longitudinal sectional view of a valve member adapted to be mounted near the master cylinder in the lines connecting the said master cylinder with the wheel cylinders;

Figure 3:
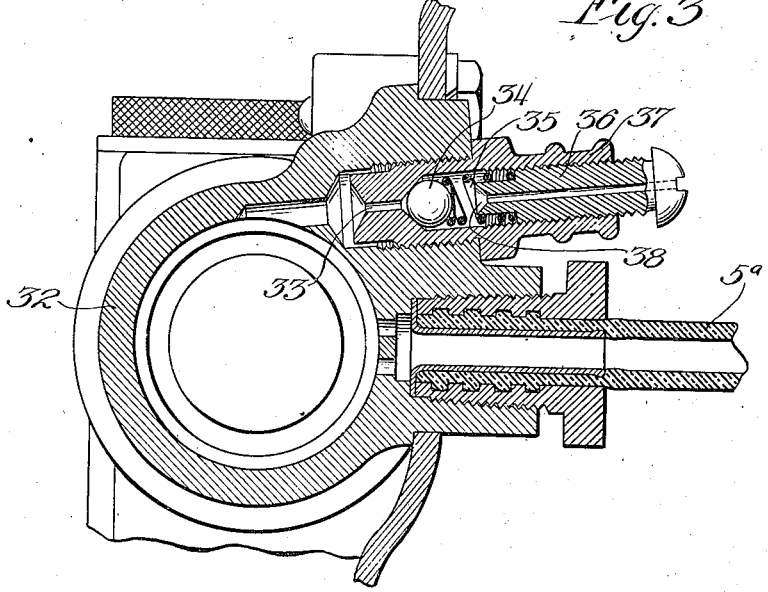
Fig. 3 is a sectional view of an improved air bleeder pin mounted in a wheel cylinder.
Figure 4:
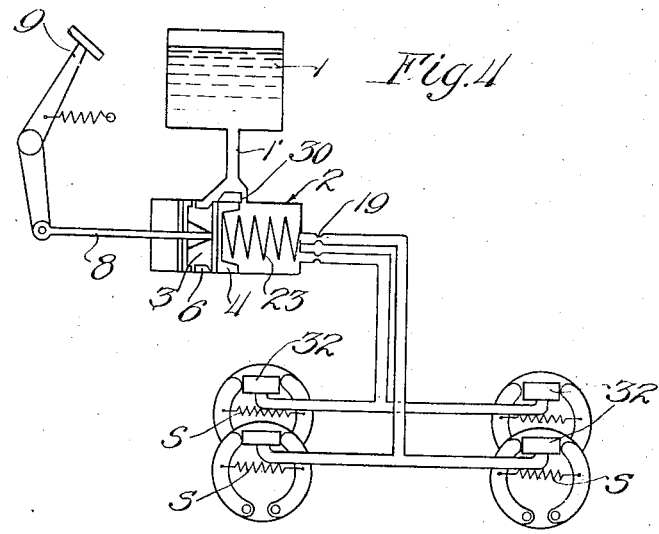
Fig. 4 is a schematic illustration of the complete hydraulic brake installation, embodying my invention.

In general, the invention consists of a reservoir 1 and master cylinder 2, disposed in a plane beneath the reservoir, a manually operated piston 3 within the cylinder having a packing cup 4, fluid pressure pipes 5 communicating with fluid pressure operated wheel brakes, and a system of passages and recesses in the cylinder and piston for replenishing fluid in the cylinder and for exhausting air bubbles from the pressure pipes and the cylinder.

The elongated piston 3 has a deep annular recess 6, one function of which is to provide a fluid seal for the piston. The rearward end of piston 3 carries an annular packing ring 7 providing a further fluid and air seal for piston 3. On its compression stroke the piston is actuated by the means of a rod 8 which detachably engages a deep pocket in the rear end of the piston, said rod being attached at its opposite end to a manually operated foot pedal 9 carried by a bracket 10, which bracket also supports the master cylinder.

In order to exclude dust and other extraneous substances from the wall of the cylinder 2, a flexible cylindrical boot 11 is provided, one end of which is secured by a ring 12 to the bracket 10, the opposite end of which is attached to a disc 13 mounted concentrically on a disc 14.

A closure cap 15 seals the inner end of the cylinder 2, and has threaded passages extending therethrough in which restriction valves interconnecting the master cylinder with fluid pressure pipes are received.

The valves (see Fig. 2) are constructed as follows: A body 16 is provided having a valve seat 17 formed therein on which a valve 18 is normally adapted to seat. The valve 18 has a small axially extending passage 19 drilled therethrough which forms a restriction through which the brake fluid must flow at a reduced speed when the valve is in closed position. A compression spring 20 is positioned about the valve 18, one end thereof being adapted to bear against the under side of the valve seat 17 and the other against a washer 21 encompassing the stem and bearing against a nut 22 carried by the valve stem. The spring tension may be readily adjusted by turning nut 22.

On the forward or compression stroke of the piston 3 actuated by movement of the foot pedal 9, pressure is exerted on the brake fluid in the cylinder ahead of the piston whereupon the brake fluid is forced out of the cylinder towards the wheel cylinders. This movement of the fluid opens the valve 18 against the tension of the spring 20, permitting rapid flow of the liquid therethrough. Upon return of the piston to its normal position, which function is accomplished by the release of the foot from pedal 9 and the expansion of a spring 23 between the piston and the closure cap 15, the fluid in the wheel cylinders and pressure pipes will tend to return to the master cylinder because of the depression formed therein when the piston recedes in the master cylinder. The speed of the flow of fluid will be retarded as the valve 18 actuated by spring 20 will close, leaving only the restricted passage 19 through which the fluid may return to the master cylinder. Inasmuch as the piston 3 actuated by spring 23 returns to its normal position before brake fluid flowing through the restricted passage 19 may fill the chamber ahead of the piston, a depression is formed therein which depression causes brake fluid to flow from the annular recess 6 through passages 25 and past the packing cup 4 into the chamber ahead of the piston, thus keeping the system ahead of the master cylinder completely charged with brake fluid under slight pressure which prevents air from entering the system through small apertures which may be created with the loosening of fittings. The slight pressure attained is caused by the compression of the liquid in the wheel cylinders actuated by the springs mounted on the brake shoes which shoes are connected to the pistons mounted in the said cylinders. When the pressure in the wheel cylinders produced by the actuation of the brake is relieved, the springs tend to draw the brake shoes away from the brake drum, forcing the pistons in the wheel cylinders to approach each other, thus creating pressure in the wheel cylinders which pressure is communicated to the pressure lines and from thence to the master cylinder. This slight pressure produced by the springs S causes the fluid to slowly return to the master cylinder through the restrictions formed by the passage 19 in valves 18. Inasmuch as surplus fluid has at this time been admitted to the cylinder in front of the piston through passages 25 as fully explained in Patent No. 1,707,063, issued March 26, 1929, on an application filed in the name of Malcolm Loughead and Erwin F. Loweke, excess fluid must be forced out of the cylinder as it is displaced by the incoming fluid through the valves. This excess fluid will pass upwardly through a restricted passage 30 communicating with the cylinder only when piston 3 is at its fully retracted position. The passage 30 is at the uppermost part of the cylinder and hence any gas or air bubbles in the fluid will pass up therethrough with the fluid which is free to return through pipe 1' to the fluid reservoir 1.

We thus produce at the release of each compression stroke an excess supply of fluid in the operating part of the fluid system which must be bled out through passage 30 to reestablish the proper quantity of fluid in the system for normal operation. This condition brought about during each release of the piston assures against the presence or inducement of air or gas bubbles in the operating portion of the fluid system, as well as affording a means for withdrawing, with the surplus fluid, any bubbles which may exist in the fluid.

The maintenance of slight positive pressure throughout the fluid line between the master cylinder and the wheel cylinders assures against the creation of gas bubbles which might otherwise occur if the fluid line was subjected to slight depression. This would be more likely to occur in warm weather as the brake fluid usually comprises a mixture of castor oil and alcohol.

The height of the fluid column represented by the differences in level between the master cylinder 2 and the level of fluid in reservoir 1 exerts at all times during which the piston 3 is in its retracted position and the system inoperative, a slight positive pressure by virtue of the weight of the fluid therein which is sufficient to maintain a seal between the packing cup 4 and the cylinder wall and likewise a seal throughout the other packing elements of the system.

In Fig. 3 we have illustrated an improved bleeder valve for the wheel cylinders 32. This bleeder valve comprises a restricted passage 33 normally closed by spring pressed valve 34, which valve may open upon an increase in pressure within cylinder 32 against the force of its spring 35. In order to preclude opening of valve 34 during the operation of brakes we employ an axially bored screw 36 received within an internally threaded sleeve 37 forming a part of the valve body. The screw 36 is normally turned down so that the inner end 38 bears against the valve 34 to preclude opening of the valve. In Fig. 3 we have shown the valve in a position as during the initial introduction of fluid to the system. Heretofore one of the problems in initially filling the system with brake fluid was to keep air from reentering the wheel cylinders upon the return stroke of the master piston which action resulted in the mere oscillation of fluid toward and away from the master cylinder as the fluid slowly sought its way into the cylinders. By employing a bleeder valve of the type we have herein disclosed, the valve 34 effectively prevents the reentry of air to the wheel cylinder once it is expelled, so that upon each compression stroke air may pass out through the valve and through the bored screw 36 whereas during the return stroke of the master piston the valve closes. It is thus possible to quickly expel all of the air from the wheel cylinder and introduce brake fluid therein. During the filling operation the operator may watch until fluid is seen to pass through the bored screw 36 and thereupon the screw should be turned tightly against valve 34 where it may remain in that position during operation of the brakes.

While we have herein shown a bleeder valve which operates to preclude the reentry of air to the brake cylinder during initial filling of the system with fluid, the restriction valves 18 operate also to preclude such reentry of air. Assuming that the bleeder valve was replaced with but a single passage from atmosphere to the interior of the cylinder 32, the valves 18 would operate to prevent the communication of depression from cylinder 2 upon the return stroke of piston 3 and thus preclude the withdrawing of air into the cylinder 32. It is thus apparent that we have provided two means whereby the initial filling of the system with brake fluid is facilitated, one of which, namely the valve 18, functions throughout the entire operation of the brakes in its primary capacity, that of assuring the maintenance of an adequate supply of fluid in the operating fluid system and in the elimination of air bubbles from the system as described.

In operation, our improved braking system functions upon the application of manual pressure to pedal 9. Movement of pedal 9 is accompanied by the compression stroke of piston 3 shutting off passage 30 and building up a fluid pressure within the cylinder 2 which is communicated through the valves 18 which are opened upon creation of such pressure through fluid pipe line 5 to the wheel cylinders 32. The valves 18, by virtue of their structure, do not offer any retardation to the communication of fluid pressure between cylinder 2 and the wheel cylinders 32 during the compression stroke of piston 3.

Upon the release of manual pressure from pedal 9 the spring 23 will cause the retractile movement of piston 3. This retractile movement tends to create a depression within the cylinder 2 in front of the packing cup 4 of the piston, resulting in the feeding of fluid from recess 6 through passages 25 into the forward end of cylinder 2 about the packing cup 4. Restriction valves 18 at this time are in the position shown in Fig. 2, and therefore the return movement of fluid from the fluid pressure pipes 5 and the wheel cylinders 32, by virtue of the force of springs S, is slow and not sufficient to satisfy the condition of slight depression within cylinder 2. Hence a surplus supply of fluid will pass into the forward end of cylinder 2 in the manner described.

When piston 3 has reached its full retractile position and the forward end of the cylinder 2 is filled with fluid, most of which is surplus fluid not actually needed during the normal operation of the brake, the continued relatively slow return movement of fluid from fluid pressure pipes 5 and wheel cylinders 32 will cause this surplus fluid accompanied by any air bubbles which may exist in the operative part of the fluid system, to pass through passage 30 where it will seek its way toward tank 1. There is thus at all times a slight positive pressure maintained throughout the operative portion of the fluid system beyond restriction valves 18 which precludes the seepage of air into the fluid or the creation of gases therein, by virtue of the inherent physical characteristics of the fluid.

This operation repeats itself upon each application of the brakes and upon each application of the brakes air or gas bubbles which might be in the system are urged toward the reserve tank 1, thus positively preventing the accumulation of harmful air pockets within the fluid pressure pipes or wheel cylinders. These pockets if allowed to form, would destroy the efficiency of the brake because of the compressible nature of the gases or air.

Our improved braking system, as herein described, also assists in the quick initial installation of fluid throughout the fluid system by reciprocation of piston 3. During that operation the air bleed opening at the wheel cylinder, which may be bleeder valve illustrated in Fig. 3, or the conventional type of valve without the check valve structure therein illustrated, is open to permit the egress of air from the wheel cylinders. The restriction valves 18 operate to readily pass fluid from cylinders 2 into the pressure pipes 5 and the wheel cylinders 32 but retard the return flow, hence the reentry of air through the bleeder opening is not appreciable during the return stroke of piston 3. When our improved bleeder valve shown in Fig. 3 is used the reentry of even this small amount of air through the bleeder opening is prevented and filling of the system with fluid is further facilitated.

What we claim as new and desire to cover by United States Letters Patent is:

1. In a hydraulic brake system, a fluid pressure producing device, brake actuating means responsive to fluid pressure, a conduit interconnecting the pressure producing device and said brake actuating means, and a normally closed valve openable to permit rapid flow of fluid under pressure from said pressure producing device through said conduit, said valve having an open restricted passageway therethrough forming the sole passage for the return of fluid to the pressure producing device.

2. In a hydraulic brake system, a fluid pressure producing device including a cylinder and a manually reciprocable piston, brake actuating means responsive to fluid pressure, a conduit interconnecting the cylinder and the brake actuating means, and a restriction valve positioned in the fluid system between said cylinder and said brake actuating means, said valve normally closed but being openable to permit the rapid flow of fluid under pressure toward the brake actuating means and having an open restriction forming the sole fluid conducting passage for the return flow of fluid toward the cylinder.

3. In a hydraulic brake system, a fluid pressure producing device, fluid pressure responsive brake actuating means, a fluid conduit interconnecting the fluid pressure producing device and said brake actuating means, said fluid conduit being in open communication with said pressure producing device at all times and including a restricted passageway, and normally closed means openable pursuant to operation of said pressure producing device to by-pass fluid around said restricted passageway.

MALCOLM LOUGHEAD.
WALLACE F. OLIVER.